United States Patent [19]

Lindner et al.

[11] Patent Number: 5,314,963
[45] Date of Patent: May 24, 1994

[54] GRAFT POLYMERS CONTAINING PHOSPHORUS

[75] Inventors: Christian Lindner; Dieter Wittmann, both of Köln, Fed. Rep. of Germany

[73] Assignee: Bayer Aktiengesellschaft, Leverkusen, Fed. Rep. of Germany

[21] Appl. No.: 146,826

[22] Filed: Nov. 2, 1993

Related U.S. Application Data

[63] Continuation of Ser. No. 859,055, Mar. 27, 1992, abandoned.

[30] Foreign Application Priority Data

Apr. 9, 1991 [DE] Fed. Rep. of Germany ....... 4111391

[51] Int. Cl.$^5$ .................... C08F 271/02; C08L 51/00
[52] U.S. Cl. ...................... 525/281; 525/64; 525/66; 525/67; 525/70; 525/80; 525/86; 525/282; 525/285; 525/287; 525/302; 525/308
[58] Field of Search ............. 525/64, 66, 67, 281, 525/282, 285, 287, 302, 308, 70, 80, 86

[56] References Cited

U.S. PATENT DOCUMENTS

| | | |
|---|---|---|
| 4,088,710 | 5/1978 | Spak et al. . |
| 4,151,226 | 4/1979 | Morinaga et al. ............... 525/253 |
| 4,959,418 | 9/1990 | Lindner et al. .................. 525/287 |
| 5,147,955 | 9/1992 | Lindner et al. .................. 526/261 |

FOREIGN PATENT DOCUMENTS

| | | |
|---|---|---|
| 0305816 | 3/1989 | European Pat. Off. . |
| 0436914 | 7/1991 | European Pat. Off. . |
| 2244523 | 4/1973 | Fed. Rep. of Germany ...... 525/281 |
| 61-53314 | 3/1986 | Japan ................................. 525/287 |

OTHER PUBLICATIONS

Translation of Japan 61-53314 previously utilized Mar. 1986.

*Primary Examiner*—Vasu S. Jagannathan
*Attorney, Agent, or Firm*—Connolly & Hutz

[57] ABSTRACT

Graft Polymers of a cross-linked copolymer of compounds of formula (I) or (II)

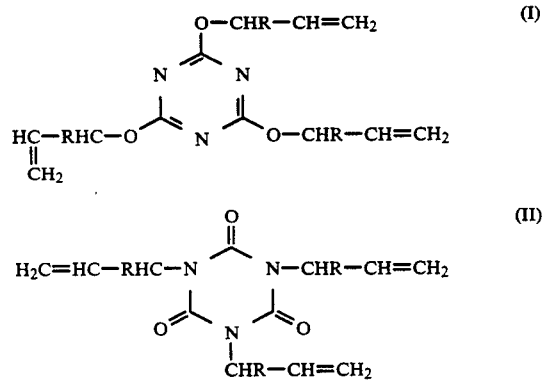

and another vinyl compound as graft basis, and a polymerized vinyl group-containing phosphonic acid derivative as graft.

14 Claims, No Drawings

GRAFT POLYMERS CONTAINING PHOSPHORUS

This application is a continuation of application Ser. No. 07/859,055 filed on Mar. 27, 1992 now abandoned.

This invention relates to particulate graft polymers in which monomers containing phosphorus are incorporated by polymerization. The new graft polymers are suitable as halogen-free flame protective additives for chemical materials.

Phosphorus compounds are already known in principle as flame retardants for chemical materials but there continues to be a search for phosphorus compounds which have a high thermal stability, are virtually non-volatile and show no tendency to migration (sweating) even over prolonged use in chemical materials.

It has been found that special particulate, cross-linked graft polymers containing phosphorus are capable of fufilling these requirements.

It has further been found that graft polymers containing phosphorus may be produced from special graft bases and special graft monomers by radical polymerization.

This invention thus relates to graft polymers of
a) from 10–90% by weight, preferably from 30–80% by weight of a (partially) cross-linked copolymer of
from 10–60% by weight, preferably from 20–40% by weight, of a compound corresponding to formula (I) or (II)

$$\underset{R = -H, -CH_3, -C_2H_5}{\text{(I)}} \quad \begin{array}{c} O-CHR-CH=CH_2 \\ \| \\ N \quad N \\ HC-RHC-O \quad N \quad O-CHR-CH=CH_2 \\ \| \\ CH_2 \end{array}$$

$$\underset{R = -H, -CH_3, -C_2H_5}{\text{(II)}} \quad \begin{array}{c} O \\ \| \\ H_2C=HC-RHC-N \quad N-CHR-CH=CH_2 \\ O \quad N \quad O \\ | \\ CHR-CH=CH_2 \end{array}$$

and from 90–40% by weight, preferably from 80–60% by weight, of another vinyl monomer, preferably a mixture of two other vinyl monomers, as graft basis and b) from 90–10% by weight, preferably from 70–20% by weight, of a polymer of phosphonic acid derivatives corresponding to formula (III)

$$\begin{array}{c} O \\ \| \\ CH_2=C-X-P-O-R' \\ | \quad | \\ Y \quad O \\ | \\ R' \end{array} \quad \text{(III)}$$

wherein
Y = —H or CH$_3$,
X = a single bond or —CH$_2$— and
R' = aryl or alkyl as a graft.

Styrene, α-methylstyrene, acrylonitrile, C$_1$–C$_8$-alkyl acrylate, C$_1$–C$_8$-alkyl methacrylate and vinyl acetate are examples of "other vinyl monomers".

Preferred graft bases a) are obtained from compounds corresponding to formula (I) or (II) and a mixture of at least two olefinically unsaturated monomers, for example, styrene and acrylonitrile or styrene and C$_1$–C$_8$-alkyl acrylate (preferably methyl acrylate, ethyl acrylate or styrene) and C$_1$–C$_8$-alkyl methacrylate (preferably methyl methacrylate). Styrene is preferably used at most in such a quantity that product a) contains not more than 50% by weight of styrene incorporated by polymerization.

Triallyl cyanurate and triallyl isocyanurate are preferred compounds (I) and (II).

The graft bases a) may be prepared continuously or discontinuously by conventional emulsion polymerization in an aqueous medium. The emulsifiers used may be, for example, higher aliphatic fatty acids, organic sulphonic acids or sulphuric acid semi-esters (anionic emulsifiers) or polyethoxylated phenol derivatives or aliphatic polyethoxylated polyether block copolymers (non-ionic emulsifiers).

Polymerization may be initiated by conventionally used radical initiators, for example by peroxides, peracids, hydroperoxides, persulphates, perphosphates or redox initiators systems. Water soluble inorganic peroxy salts such as potassium peroxodisulphate and potassium peroxo diphosphate are particularly preferred.

The copolymerization for the preparation of the graft basis a) is preferably continued until the highest possible conversion rates are obtained (more than 97% by weight, preferably 99% by weight or more). This ensures that these polymers will be highly cross-linked and have gel contents above 90% by weight.

The graft bases a) are generally particulate. The size of the particles (particle diameter d$_{50}$) is preferably from 0.05 to 1 μm, preferably from 0.06 to 0.3 μ (determined by light scattering).

Preferred graft monomers are phosphonic acid derivatives corresponding to formula (III) wherein
X = —CH$_2$— and
R' = C$_1$–C$_8$-alkyl or C$_6$–C$_{12}$-aryl, optionally substituted with O- or N- groups.

The following are examples of preferred groups denoted by R': Phenyl, naphthyl, methoxyphenyl, ethoxyphenyl, acetamidophenyl and methyl-, ethyl, propyl-, butyl- and hexyl-phenyl.

Preferred grafts b) are obtained by the copolymerization of phosphonic acid derivatives of formula (III) and maleic acid derivatives such as maleic acid anhydride, maleic acid imides or maleic acid esters, in particular maleic acid anhydride.

Other vinyl monomers may in addition be incorporated in the graft b) by polymerization, preferably in quantities of up to 20% by weight, based on 100 parts of b). The following are examples: styrenes, α-methyl styrene, acrylonitrile, methacrylonitrile, vinyl acetate, vinyl propionate, vinyl ethers, C$_1$–C$_8$-aklylacrylates, C$_1$–C$_8$-alkylmethacralates and dienes.

The graft polymers according to the invention may be obtained by a multi-stage radical polymerization. The graft basis a) is produced in a first stage by emulsion polymerization in an aqueous medium. The necessary conditions and auxiliary substances are described above. The latices thus obtained serve as graft basis.

Graft polmerization of the monomers which form the graft sheath b) may also be carried out in aqueous emulsion, preferably with the aid of emulsifiers and initiators. The graft polymers may then be isolated, e.g by coagulation and filtration (method 1). Alternatively, the graft basis a) may be separated from its aqueous emulsion and coagulated, washed and worked up into a powder. By dispersing this powder in an organic liquid such as toluene, ethyl benzene, xylene, acetone or methylethyl ketone, organic dispersions are obtained in which the monomers forming the graft sheath b) are polymerized by radical polymerization. The graft polymers may be separated, e.g by filtration or evaporation (method 2). This method is preferred.

The graft polymers according to the invention are colourless, finely divided powders which are virtually insoluble in organic solvents due to the high degree of cross-linking.

The graft polymers according to the invention may be mixed with known thermoplastic synthetic resins, e.g. in Brabender mixers, screw extruders or kneaders. The graft polymers are thus distributed in a highly disperse form in a thermoplastic melt and may be used as flame retardants.

The invention thus further relates to the use of the graft polymers according to the invention as flame retardants in thermoplastic chemical materials, in particular in thermoplasts such as, for example, styrene/acrylonitrile/ butadiene terpolymers (ABS), polymethyl methacrylate, polystyrene, polyvinyl chloride, polypropylene, ethylene polymers, aromatic polycarbonates, polyesters such as polyalkylene terephthlate or polyamides such as polyamide-6 or -6,6. Polycarbonates such as bisphenol-A polycarbonate and ABS and mixtures thereof are preferred thermoplasts.

The graft polymers according to the invention are preferably used in quantities of from 1 to 20% by weight in such moulding compounds. The flame proofed chemical materials thus obtained require less halogen-containing flame retardants or none at all and they have high mechanical strength values without the plasticizer effect which normally occurs. The advantage of the graft polymers of being resistant to migration comes into effect in processing and in use. In addition, the molding compounds are highly stable to the influence of light and heat.

EXAMPLES

1) Preparation of the Graft Base 4000 parts by weight of water and 10 parts by weight of the sodium salts of $C_{14}$–$C_{16}$-alkyl sulphonic acids are introduced into a reactor. The following solutions are introduced into the reactor at 70° C. within 5 hours at a reaction temperature of 70° C. after initiation with a solution of 10 parts by weight of potassium peroxodisulphate in 200 parts by weight of water:

| Solution 1: | n-Butyl acrylate | 1700 parts by weight |
| --- | --- | --- |
| | Styrene | 300 parts by weight |
| | Triallyl cyanurate | 1000 parts by weight |
| Solution 2: | Water | 2000 parts by weight |
| | Sodium salt of $C_{14}$–$C_{16}$- alkyl sulphonic acids | 50 parts by weight. |

The reaction mixture is then completely polymerized by heating to 70° C. for 4 hours. An emulsion having a solids content of 32% by weight is obtained. The average particle diameter ($d_{50}$) is 0.15 μm.

The emulsion is coagulated with Epsom salt ($MgSO_4 \cdot H_2O$). The isolated polymer is washed and dried to form a powder. The polymer is highly cross-linked and has a gel content of 97% by weight (in DMF).

2) Preparation of the Graft Polymers 2.1. 400 parts by weight of finely divided powder 1) are dispersed with thorough stirring in a mixture of 500 parts by weight of ethyl benzene and 700 parts by weight of vinyl phosphonic acid dimethyl ester. 50 parts by weight of maleic acid anhydride are then added. Polymerization is initiated at 90° C. by the addition of 4 parts by weight of tert.-butyl hydroperoxide. After a reaction time of 6 hours at 90° C., the reaction mixture is mixed with 3000parts by weight of ethanol and the graft polymer is isolated by filtration. The isolated polymer precipitates as a powder. It contains 1.8% by weight of phosphorus.

2.2. Method 2.1 is repeated but 700 parts by weight of allyl phosphonic acid diethyl ester are used instead of vinyl phosphonic acid dimethyl ester. The phosphorus content of the isolated polymer is 3% by weight.

2.3. Comparison experiment.

Experiment 2.2 is repeated but with the attempt to carry out polymerization and working up of the product in the absence of 1) (graft basis). No formation of copolymer is observed under the conditions of polymerization 2.2.

2.4.The polymer 2.2 is extracted with toluene at room temperature in a Soxleth extractor (24 hours). The insoluble polymer thus treated has a phosphorus content of 3.06% by weight, i.e it consists virtually completely of a graft polymer of the phosphorus monomer polymer on the graft basis.

3. Thermoplastic Molding Compounds

Components used:

3.1. Homopolycarbonate based on bisphenol A having a relative solution viscosity of 1.32 determined in $CH_2Cl_2$ at 25° C., prepared using phenol as chain terminator.

3.2. Styrene/acrylonitrile copolymer having a styrene/acryonitrile ratio by weight of 72:28 and a limiting viscosity of $(\eta) \times 0.55$ dl/g (determined in DMF at 20° C.).

3.3. Triphenyl phosphate.

3.4. Tetrafluoroethylene polymer (®Teflon 30N (Dupont)).

3.5. Graft polymer of 50% by weight of a styrene/acrylonitrile mixture (ratio by weight 72:28) on 50% by weight of particulate polybutadiene having an average particle diameter ($d_{50}$) of 0.4 μm obtained by emulsion polymerisation.

The components are mixed in a 3 liter internal kneader at 200° to 220° C. and moldings are produced in an injection molding machine at 260° C.

The fire characteristics were determined on samples having a thickness of 3.2 mm by the method of UL-Subj. 94 V (for details of method see EP 258 728, p. 8).

The strength of the joint line was determined by measuring the impact strength according to DIN 53 452 (Charpy method) on the connecting seam of samples measuring 170×10×4 mm which had been injection molded from both sides.

TABLE 1

Composition of molding compounds (parts by weight)

| Components | Molding compounds I | Molding compounds II |
|---|---|---|
| 3.1 | 86 | 86 |
| 3.2 | 7 | 7 |
| 3.3 | 2.5 | 2.5 |
| 3.4 | 0.3 | 0.3 |
| 3.5 | 7 | 7 |
| 2.2 | — | 4 |

I = comparison
II = according to the invention

TABLE 2

Properties of the molding compounds

|  | I | II |
|---|---|---|
| Fire characteristics UL 94 V | VO individual values: 10/-/-/- | VO individual values: 10/-/-/- |
| Joint line strength $a_nF$ at room temperature | 8.2 | 12.4 |

What is claimed:

1. A graft polymer comprising:
   a) from 10 to 90% by weight of a crosslinked or partially cross-linked copolymer of from 10 to 60% by weight of a compound corresponding to formula (I) or (II)

$$\underset{\text{(I)}}{\text{structure with triazine ring, O—CHR—CH=CH}_2 \text{ substituents}}$$

wherein R represents —H, —CH$_3$, or —C$_2$H$_5$;

$$\underset{\text{(II)}}{\text{structure with isocyanurate ring, CHR—CH=CH}_2 \text{ substituents}}$$

wherein R represents —H, —CH$_3$, or —C$_2$H$_5$; and from 90 to 40% by weight of styrene, α-methyl styrene, acrylonitrile, C$_1$-C$_8$ alkyl acrylate, C$_1$-C$_8$ alkyl methacrylate, vinyl acetate, or mixtures thereof, as graft basis; and b) from 90 to 10% by weight of a polymer comprising phosphonic acid derivatives corresponding to formula (III)

$$CH_2=\underset{Y}{\overset{}{C}}-X-\underset{\underset{R'}{O}}{\overset{\overset{O}{\|}}{P}}-O-R' \quad \text{(III)}$$

wherein
   Y represents —H or —CH$_3$;
   X represents a single bond or —CH$_2$; and
   R' represents aryl or alkyl;
   as graft superstrate.

2. Graft polymers according to claim 1 in which the graft superstrate is a copolymer of monomers corresponding to formula (III) of claim 4 and maleic acid anhydride, maleic acid imide or maleic acid esters.

3. The graft polymer of claim 2, wherein the graft b) additionally comprises up to 20% by weight, based on weight of graft, of other vinyl monomers selected from the group consisting of styrene, α-methyl stryrene, acrylonitrile, methacrylonitrile, vinyl acetate, vinyl propionate, vinyl ethers, C$_{1-8}$ alkylacrylates, C$_{1-8}$ alkylmethacrylates, and dienes.

4. The graft polymer of claim 1 comprising 30 to 80% by weight of a) and 70 to 20% by weight of b).

5. The graft polymer of claim 1 wherein the compounds corresponding to formula (I) or (II) consist of triallyl cyanurate or triallylisocyanurate.

6. The graft polymer of claim 1 wherein, in the derivatives corresponding to formula (III), X represents —CH$_2$— and R' represents C$_{1-8}$ alkyl or C$_{6-12}$ aryl.

7. The graft polymer of claim 1 which is halogen free.

8. The graft polymer of claim 1, wherein R' is C1–8 alkyl or C6–12 aryl, optionally substituted with O- or N- groups.

9. The graft polymer of claim 1, wherein R' is phenyl, naphthyl, methoxyphenyl, ethoxyphenyl, acetamidophenyl, or methyl-, ethyl-, propyl-, butyl- or hexyl-phenyl.

10. A flameretardant mixture of a thermoplast and 1 to 20% by weight of the graft copolymer of claim 1.

11. The flame retardant mixture of claim 10 wherein the thermoplast is selected from ABS, polymethyl methacrylate, polystyrene, polyvinylchloride, polypropylene, polyethylene, aromatic polycarbonate, polyester, polyamide, or mixtures thereof.

12. The flame retardant mixture of claim 11 wherein the thermoplast is polycarbonate.

13. The flame retardant mixture of claim 10 wherein the polycarbonate is based on bisphenol A.

14. The flame retardant mixture of claim 9 wherein the thermoplast is a mixture of ABS and polycarbonate.

* * * * *